(12) United States Patent
Zhang et al.

(10) Patent No.: US 9,101,892 B2
(45) Date of Patent: Aug. 11, 2015

(54) PREPARATION METHOD AND USE FOR FLUORINE-CONTAINING MICROEMULSION

(75) Inventors: Jianxin Zhang, Sichuan (CN); Xianquan Hu, Sichuan (CN); Jiong He, Sichuan (CN); Rong Bai, Sichuan (CN)

(73) Assignee: ZHONGHAO CHENGUANG RESEARCH INSTITUTE OF CHEMICAL INDUSTRY CO., LTD, Sichuan (CN)

( * ) Notice: Subject to any disclaimer, the term of this patent is extended or adjusted under 35 U.S.C. 154(b) by 1 day.

(21) Appl. No.: 13/881,375

(22) PCT Filed: Dec. 30, 2010

(86) PCT No.: PCT/CN2010/002212
§ 371 (c)(1),
(2), (4) Date: Apr. 25, 2013

(87) PCT Pub. No.: WO2012/058793
PCT Pub. Date: May 10, 2012

(65) Prior Publication Data
US 2013/0213270 A1    Aug. 22, 2013

(30) Foreign Application Priority Data
Nov. 2, 2010  (CN) .......................... 2010 1 0531932

(51) Int. Cl.
| C08F 2/26 | (2006.01) |
|---|---|
| C08F 2/22 | (2006.01) |
| B01F 17/00 | (2006.01) |
| C08F 214/18 | (2006.01) |
| C08F 14/18 | (2006.01) |
| C08G 65/00 | (2006.01) |
| C08L 71/02 | (2006.01) |

(52) U.S. Cl.
CPC ............... *B01F 17/0035* (2013.01); *C08F 2/22* (2013.01); *C08F 2/26* (2013.01); *C08F 14/18* (2013.01); *C08F 214/18* (2013.01); *C08G 65/007* (2013.01); *C08L 71/02* (2013.01); *C08G 2650/48* (2013.01)

(58) Field of Classification Search
USPC ............................................ 516/74; 106/505
See application file for complete search history.

(56) References Cited

U.S. PATENT DOCUMENTS

| 4,864,006 | A | * | 9/1989 | Giannetti et al. | ............. 526/209 |
|---|---|---|---|---|---|
| 2006/0205921 | A1 | * | 9/2006 | Marchionni et al. | .......... 528/401 |
| 2008/0015304 | A1 | * | 1/2008 | Hintzer et al. | ................ 524/544 |

FOREIGN PATENT DOCUMENTS

| EP | 1568730 A1 | * | 6/2005 |
|---|---|---|---|
| EP | 1568730 A1 | * | 8/2005 |
| GB | 1104482 | * | 2/1968 |
| JP | 09-227507 | * | 9/1997 |
| JP | 9227507 | | 9/1997 |
| WO | 2010017665 | | 2/2010 |
| WO | WO-2010/017665 A1 | * | 2/2010 |

* cited by examiner

Primary Examiner — Peter D Mulcahy
Assistant Examiner — Henry Hu
(74) Attorney, Agent, or Firm — Eagle IP Limited; Jacqueline C. Lui

(57) ABSTRACT

A microemulsion consisting of water, peroxidic fluoropolyether carboxylate and oil is provided. When the microemulsion is used in homopolymerization, binary copolymerization or multi-component copolymerization of fluorine-containing olefin monomers, an emulsion with a low viscosity and a particle diameter of 30-200 nm can be obtained.

8 Claims, No Drawings

PREPARATION METHOD AND USE FOR FLUORINE-CONTAINING MICROEMULSION

This application is a 371 application of International application No. PCT/CN2010/002212 filed on Dec. 30, 2010, which claims priority to Chinese Application No. 201010531932.0 filed on Nov. 2, 2010, both of which are incorporated by reference, as if fully set forth herein.

TECHNICAL FIELD

The invention relates to the field of polymer chemistry, particularly to a fluorine-containing microemulsion, the preparation method and use thereof.

BACKGROUND ART

A microemulsion is a liquid mixture comprising at least three components of water phase (aqueous solution), oil phase (organic solvent) and surfactant, it is a transparent or semi-transparent, thermodynamically stable dispersing liquid with macro-homogeneity and micro-heterogeneity, having the characteristics of low viscosity and isotropy etc. In a microemulsion, continuous media are dispersed into numerous micro-spaces which have small, uniform particle sizes and high stability. Generally, a microemulsion can exist stably for several months. There are three types of microemulsions, i.e. water-in-oil microemulsions (W/O), oil-in-water microemulsions (O/W) and bicontinuous microemulsions.

Microemulsions are widely used and play an important role in the fields including petroleum, cosmetics, medicine, polymers, spinning, papermaking and printing; and especially widely used in the fine chemistry industry such as pesticides, pharmaceutics, cosmetics, cooling fluids for metal, liquid detergents, auxiliaries for oil field exploitation, printing and dyeing auxiliaries.

The formation of a microemulsion mainly depends on the matching of each component in the system. The factors determining the stability of a microemulsion mainly are the kinds of the surfactants, and the ratio of surfactant to oil or water. There are many kinds of surfactants generally used in preparing a microemulsion, including anionic surfactant, cationic surfactant and non-ionic surfactant.

As to conventional surfactants such as perfluorooctane sulfonate (PFOS), perfluorooctanoic acid (PFOA) or fluoropolyether, since their emulsifying capability can only reach an average particle size range of 150-300 nm in dispersion polymerization reaction and emulsion polymerization reaction, the formed micelles will be destroyed by violently stirring, and breaking emulsion too early in the polymerization process will bring unsafe explosive polymerization to the polymerization reaction of tetrafluoroethylene etc.

CONTENTS OF THE INVENTION

The object of the invention is to provide a microemulsion using peroxidic fluoropolyether carboxylate as emulsifier, the preparation method and use thereof.

In order to achieve the object of the invention, a microemulsion according to the invention comprises water, peroxidic fluoropolyether carboxylate and oil phase (fluorinated alkane with carbon atoms of 5-20) in a weight ratio of 95-105 to 8-10 to 2-3; wherein the average molecular weight of the peroxidic fluoropolyether carboxylate is 300-5000, having the structure represented by the following formula (I):

$$A\text{-}O\text{-}(G_f\text{-}O)_m(G_f\text{-}O\text{---}O)_n\text{---}(CF_2O)_p\text{---}(CF_2OO)_q\text{---}(CF(CF_3)O)_r\text{---}B \quad (I)$$

wherein
$G_f$ is —$CF_2CF(CF_3)$— or —$CF(CF_3)CF_2$—,
A is —$CF_3$, —COOM or —$CF_2COOM$;
B is —COOM or —$CF_2COOM$;
M is —H, —$NH_4$ or alkali metal element; and
m, n, p, q and r meet the following requirements:
(1) m, n, p, q and r are integers not less than 1;
(2) $n+q\geq 2$;
(3) $n+q\leq m+p+r$; and
(4) $m\geq n+p+q+r$.

Preferably, the microemulsion comprises water, peroxidic fluoropolyether carboxylate and fluorinated alkane with carbon atoms of 5-20 in a weight ratio of 100 to 8-10 to 2.5.

The acid value of the peroxidic fluoropolyether carboxylic acid used for preparing the peroxidic fluoropolyether carboxylate is 20-120 mg KOH/g; and the peroxide value is 0.5 wt %-10.0 wt %.

The peroxidic fluoropolyether carboxylic acid according to the invention is prepared with reference to the patent No. GB 1,104,482, wherein hexafluoropropylene (HFP) is used as main raw material to react under the conditions of low temperature and light of ultraviolet lamp, then the resulting product is hydrolyzed, and the organic layer is taken to conduct fractional distillation under negative pressure so as to collect fractions with different boiling ranges (30° C.-180° C.). The composition unit and structure of the resulting substance are determined by $^{19}$FNMR (nuclear magnetic resonance), and the peroxide value of the resulting substance is determined by iodometry method.

The invention further provides a method for the preparation of the above microemulsion, which comprises the steps of: mixing water, peroxidic fluoropolyether carboxylate and oil phase in a weight ratio and adding the mixture into a reactor, stirring at a speed of 1000-1500 rpm for 30-100 min, then vacuumizing the reactor and replacing with nitrogen for 3-4 times so as to keep the content of oxygen in the mixture less than 30 ppm, obtaining a semi-transparent microemulsion at room temperature.

The oil phase of the microemulsion according to the invention generally includes the following additives: paraffin oil, fluorinated kerosene, octafluoronaphthalene (OFN), chlorotrifluoroethylene oligomers (polymerization degree 5-8), perfluorotributylamine, hexafluorobenzene, and commercial available fluorinated solvents; wherein the fluorinated alkane with carbon atoms of 5-20 may be linear or branched organic compounds.

The microemulsion prepared according to the invention can be used in polymerization reactions including dispersion polymerization of tetrafluoroethylene, dispersion polymerization of hexafluoropropene-modified tetrafluoroethylene, dispersion polymerization of meltable tetrafluoroethylene, emulsion polymerization of tetrafluoroethylene-hexafluoropropene copolyerization and emulsion polymerization of fluoro-rubber.

When the microemulsion prepared according to the invention is used in dispersion polymerization of tetrafluoroethylene, hexafluoropropene or perfluoro(propyl vinyl ether)-modified tetrafluoroethylene, and emulsion polymerization of tetrafluoroethylene-hexafluoropropene, a emulsion with particle size of 30-150 nm can be obtained; and when it is used in emulsion polymerization of fluoro-rubber, a emulsion with particle size of 30-200 nm can be obtained.

The advantages of the invention lie in that: a fluoro-containing microemulsion with high molecular weight is obtained by replacing surfactant of perfluorooctanoic acid ammonium salt with fluoro-surfactant of peroxidic fluoropolyether carboxylate. The microemulsion according to the invention, different from conventional lactescence, can overcome the shortcomings of using the emulsifiers including PFOS, PFOA and perfluoropolyether, i.e., the lactescence of the invention can be converted from turbid to semi-transparent or transparent, and can be used for photocatalysis polymerization and thereby prepare high purity polytetrafluoroethylene, modified polytetrafluoroethylene and binary copolymerization/multi-component copolymerization fluoro-rubber. As compared with polytetrafluoroethylene, modified polytetrafluoroethylene and fluoro-rubber emulsions prepared with conventional emulsifier, the microemulsion prepared according to the invention have less viscosity and smaller average particle size, and are particularly suitable to the film-forming materials for products processing and fusion moulding processing. The microemulsion according to the invention can prepare stable single-dispersed microlatexes which do not have non-uniform coating caused by particle fragmentation, and its fine colloidal particles increase the surface area and improve the fusion of the particles in the process of moulding operation and are helpful for the processing of the moulded product. There are peroxy bonds —O—O— and ether bonds at the main chain of peroxidic fluoropolyether carboxylates; analyzing from the point of the bond energy and bond length, the C—F linkage is very stable, and introducing appropriate amount of ether bonds are helpful for C—O—C chain to freely rotate, crimp and loose. The above structural characteristics make fluoropolyethers have the properties of high temperature resistance and chemical stability, and are suitable to be used as surfactants. The peroxy bonds have less bond energy and long bond length, and it is unstable and easy to decompose in the reaction process. In order to produce fluoro-monomer aqueous dispersion, using peroxidic fluoropolyether carboxylate as surfactant to cooperate with auxiliaries such as initiator can make the process of reaction induction perform gently and is helpful for controlling the reaction speed of polymerization, and thereby reduce the amount of initiator used in the reaction or shorten the reaction time. As compared with conventional emulsions, the microemulsions prepared according to the invention have less viscosity and can form stable single-dispersed micro-latexes, which can improve the anti-fragment ability of the coating when it is used in a coating, and the surface area increased by the fine colloidal particles can improve the fusion of the particles in the sintering process of moulding operation.

EMBODIMENTS

The following examples are intended to illustrate the present invention without limiting its scope.

Example 1

Preparation of Peroxidic Fluoropolyether Carboxylic Acid and the Ammonium Salt Thereof With reference to the preparation method of patent No. GB 1,104,482 (1968), a ultraviolet lamp (wave length 250 nm-400 nm) radiation device with a power of 125 W is fixed on a pressure resistant steel reactor with a volume of 2 L and equipped with a reflux device at $-70°$ C., the reactor and raw material are precooled, then 2 kg of hexafluoropropene (HFP) precooled to $-45°$ C. is added to the precooled reactor; a mixed gas of oxygen ($O_2$, at a speed of 20 L/h and calculated in standard state) and $C_2F_3Cl$ (at a speed of 2.5 L/h and calculated in standard state) is fed through the bottom of the reactor, and the reaction temperature is keep at $-45°$ C. for 8 h; then the ultraviolet radiation is ceased so does the reaction; the cooling is ceased and HFP is recovered. The resulting product is taken out from the bottom of the reactor and put in a container with stirring, and an appropriate amount of hot water at $90°$ C. is added thereto to hydrolyze for 16 h, stirring is ceased, then the mixture is allowed to stand still to separate into layers, and the oil layer is taken out to obtain 665 g of hydrolyzed product is obtained; the hydrolyzed product is subjected to fractional distillation under negative pressure so as to collect fractions with different boiling ranges ($30°$ C.-$180°$ C.) and 604 g of peroxidic fluoropolyether carboxylic acid with a certain range of acid value and/or peroxide value is obtained. The peroxide values of the resulting substance of each fraction are analyzed by iodometry method, and the composition unit and structure of the resulting substances are determined by $^{19}$FNMR.

Preparation of Ammonium Salt of Peroxidic Fluoropolyether Carboxylic Acid 235 ml of deionized water is added to 100 g of peroxidic fluoropolyether carboxylic acid with acid value of 70.1 mg KOH/g, and 25-28 ml of aqueous ammonia (in a concentration of 28%) is added dropwise to the mixture with stirring until the peroxidic fluoropolyether carboxylic acid is fully dissolved, and the solution is measured for pH (pH 7-8), and stored for later use.

Example 2

Peroxidic fluoropolyether carboxylic acid [$CF_3O(CF_2CF(CF_3)O)$ $(CF_2OO)(C(CF_3)FO)COOH$, acid value 70.1 mg KOH/g, peroxide value 5%] obtained according to the method of Example 1 as emulsifier is prepared into ammonium salt of peroxidic fluoropolyether carboxylic acid.

32 L of deionized water, 2560 g of ammonium salt of peroxidic fluoropolyether carboxylic acid, 800 g of paraffin oil and 5 g of ammonium persulfate are added to a reactor, the mixture is stirred at a speed of 1500 rpm for 60 min. Then the reactor is vacuumized and replaced with nitrogen gas for 3-4 times, the content of oxygen in the mixture is detected to be 30 ppm or less, and a semi-transparent microemulsion with a pH value of $7\pm0.5$ is obtained at room temperature. Then the temperature in the reactor is increased to $75\pm1°$ C. by heating, gas-phase monomers of tetrafluoroethylene are fed into the reactor, and the polymerization reaction begins, the temperature in the reactor is controlled to steadily increase and the pressure of the polymerization reaction is maintained at $2.3\pm0.05$ MPa; when the temperature in the reactor is increased to $95\pm2°$ C. and the speed of the polymerization reaction begins to decrease, the reaction is ceased, and the tetrafluoroethylene monomers in the reactor are recovered. A semi-transparent polytetrafluoroethylene microemulsion is obtained with solid content of 14% and pH of 5-6; and the polymer has an average particle size of 60 nm and standard specific gravity (SSG) of 2.17.

Example 3

Peroxidic fluoropolyether carboxylic acid [$CF_3O(CF_2CF(CF_3)O)_3(CF_2CF(CF_3)OO)(CF_2O)(C(CF_3)FO)CF_2COOH$, acid value 43 mg KOH/g, peroxide value 2.8%] obtained according to the method of Example 1 as emulsifier is prepared into ammonium salt of peroxidic fluoropolyether carboxylic acid.

28 L of deionized water, 2240 g of ammonium salt of peroxidic fluoropolyether carboxylic acid, 700 g of paraffin oil and 20 g of ammonium persulfate are added to a reactor, the mixture is stirred at a speed of 1500 rpm for 60 min. Then the reactor is vacuumized and replaced with nitrogen gas for 3-4 times, the content of oxygen in the mixture is detected to be 30 ppm or less, and a semi-transparent microemulsion with a pH value of 6-7 is obtained at room temperature. Then the temperature in the reactor is increased to 65±1° C., and an initial monomer mixture of tetrafluoroethylene and hexafluoropropene in a weight ratio of 1:4 is fed into the reactor, the pressure of polymerization is 2.4±0.05 Mpa, meanwhile 15 wt % of sodium sulfite solution is pumped into the reactor, and the polymerization reaction begins, then the pressure in the reactor is decreasing and a monomer mixture of tetrafluoroethylene/hexafluoropropene in a weight ratio of 1:4 is constantly supplemented into the reactor, during the whole process of polymerization reaction, the pressure in the reactor is maintained at 2.4±0.05 Mpa. The amount of the reductant sodium sulfite pumped into the reactor is interlock-controlled with the change of the polymerization reaction speed, and the reaction time is 210 min to 240 min. After the reaction is finished, the remainder of the monomer mixture is recovered, and a binary copolymerization microemulsion of tetrafluoroethylene and hexafluoropropene is obtained. The solid content of the copolymerization emulsion is 12%, and the melt index of the polymer is 6 g/10 min, the melt processing property of the polymer is very good, and the average particle size of the polymer is 30 nm.

Example 4

Peroxidic fluoropolyether carboxylic acid [$CF_3O(CF_2CF(CF_3)O)_3(CF_2CF(CF_3)OO)(CF_2O)(C(CF_3)FO)CF_2COOH$, acid value 43 mg KOH/g, peroxide value 2.8%] obtained according to the method of Example 1 as emulsifier is prepared into ammonium salt of peroxidic fluoropolyether carboxylic acid.

28 L of deionized water, 2240 g of ammonium salt of peroxidic fluoropolyether carboxylic acid, 700 g of paraffin oil and 20 g of ammonium persulfate are added to a reactor, the mixture is stirred at a speed of 1500 rpm for 60 min. Then the reactor is vacuumized and replaced with nitrogen gas for 3-4 times, the content of oxygen in the mixture is detected to be 30 ppm or less, and a semi-transparent microemulsion with a pH value of 6-7 is obtained temperature. Then the temperature in the reactor is increased to 70±1° C., at room and an initial gas-phase monomer mixture of vinylidene fluoride and hexafluoropropene in a weight ratio of 1:4 is fed into the reactor for binary copolymerization, the pressure of polymerization is 2.3±0.05 Mpa, meanwhile 15 wt % of sodium sulfite solution is pumped into the reactor, and the polymerization reaction begins, then the pressure in the reactor decreases and a monomer mixture of vinylidene fluoride/hexafluoropropene in a weight ratio of 1:4 is constantly supplemented into the reactor, during the whole process of polymerization reaction, the pressure in the reactor is maintained at 2.3±0.05 Mpa, and the temperature during the polymerization process is maintained at 70±1° C., the amount of sodium sulfite (15 wt %) pumped into the reactor is interlock-controlled with the change of the polymerization reaction, speed. The total reaction time is 300 min. After the reaction is finished, the monomer mixture in the reactor is recovered, and a binary copolymer is obtained. The solid content of the binary copolymer is 14%, and the average particle size of the binary copolymer is 50 nm; the Mooney viscosity (121° C., 1+10) of the polymer is 35, and the polymer is suitable to be processed into fluororubber extruded products.

Example 5

Peroxidic fluoropolyether carboxylic acid [$CF_3O(CF_2CF(CF_3)O)(CF_2OO)(C(CF_3)FO)COOH$, acid value 70.1 mg KOH/g, peroxide value 5%] obtained according to the method of Example 1 as emulsifier is prepared into ammonium salt of peroxidic fluoropolyether carboxylic acid.

32 L of deionized water, 2560 g of ammonium salt of peroxidic fluoropolyether carboxylic acid, 800 g of paraffin oil, 5 g of ammonium persulfate and 85 g of perfluoro(propyl vinyl ether) are added to a reactor, the mixture is stirred at a speed of 1500 rpm for 60 min. Then the reactor is vacuumized and replaced with nitrogen gas for 3-4 times, the content of oxygen in the mixture is detected to be 30 ppm or less, and a semi-transparent microemulsion with a pH value of 6.5-7 is obtained at room temperature. Then the temperature in the reactor is increased to 78±1° C., gas-phase monomers of tetrafluoroethylene are fed into the reactor until the pressure in the reactor is 2.4±0.05 MPa; when the polymerization reaction begins, the pressure in the reactor is decreasing, and the pressure of the reaction is maintained at 2.4±0.05 MPa during the whole polymerization reaction process, the temperature of polymerization reaction is controlled to increase slowly, and the reaction is ceased at a temperature of 90±2° C.; 1 ml of aqueous methanol solution is pumped into the reactor during the mid- to late stage of the polymerization; when the reaction is finished, the tetrafluoroethylene monomers in the reactor are recovered. A modified polytetrafluoroethylene microemulsion is obtained with solid content of 13 wt % and average particle size of 45 nm, the transparency of the microemulsion is better than that of the polytetrafluoroethylene microemulsion; the standard specific gravity (SSG) of the polymer is 2.16, and the polymer has excellent film-forming property.

Although the invention has been described with the above general explanation and specific embodiments, on the basis of the invention it is obvious that various modifications and changes to the invention may be made by a person skilled in the art without departing from the spirit of the invention, the modifications and changes also fall within the scope of the invention as defined by the appended claims.

INDUSTRIAL APPLICABILITY

When the microemulsion prepared according to the method of the invention is used in homopolymerization, binary copolymerization or multi-component copolymerization of fluorine-containing olefin monomers, an emulsion with a low viscosity and a particle diameter of 30-200 nm can be obtained. As compared with traditional emulsion, the microemulsion according to the invention can form a single-dispersed micro-latex which can improve the anti-fragment property of the coating while it is used in a coating, and the surface area increased by the fine colloidal particles can improve the fusion of the particles in the sintering process of moulding operation.

What is claimed is:

1. A microemulsion, characterized in that it comprises water, peroxidic fluoropolyether carboxylate and fluorinated alkane with carbon atoms of 5-20, wherein a weight ratio among said water, peroxidic fluoropolyether carboxylate and fluorinated alkane is x:y:z, wherein x is in the range of 95-105; y is in the range of 8-10; and z is in the range of 2-3;

the average molecular weight of the peroxidic fluoropolyether carboxylate is 300-5000, and has the structure represented by the following formula (I):

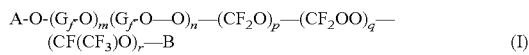
(I)

wherein
$G_f$ is —$CF_2CF(CF_3)$— or —$CF(CF_3)CF_2$—;
A is —$CF_3$, —COOM or —$CF_2$COOM;
B is —COOM or —$CF_2$COOM;
M is —H, —$NH_4$ or alkali metal element; and
m, n, p, q and r meet the following requirements:
(1) m, n, p, q and r are integers not less than 1;
(2) $n+q \geq 2$;
(3) $n+q \leq m+p+r$; and
(4) $m \geq n+p+q+r$.

2. The microemulsion according to claim 1, wherein said x is 100; and said z is 2.5.

3. The microemulsion according to claim 1, characterized in that the acid value of the peroxidic fluoropolyether carboxylic acid used for preparing the peroxidic fluoropolyether carboxylate is 20-120 mg KOH/g and the peroxide value is 0.5 wt %-10.0 wt %.

4. The microemulsion according to claim 1, characterized in that the content of oxygen in the microemulsion is less than 30 ppm.

5. The microemulsion according to claim 2, characterized in that the acid value of the peroxidic fluoropolyether carboxylic acid used for preparing the peroxidic fluoropolyether carboxylate is 20-120 mg KOH/g and the peroxide value is 0.5 wt %-10.0 wt %.

6. The microemulsion according to claim 2, characterized in that the content of oxygen in the microemulsion is less than 30 ppm.

7. The microemulsion according to claim 3, characterized in that the content of oxygen in the microemulsion is less than 30 ppm.

8. The microemulsion according to claim 4, characterized in that the content of oxygen in the microemulsion is less than 30 ppm.

* * * * *